United States Patent [19]

Clift

[11] Patent Number: 5,519,756
[45] Date of Patent: May 21, 1996

[54] LOCAL ALARM SYSTEM TAMPER PROTECTION DEVICE

[75] Inventor: Brian K. Clift, Vidalia, Ga.

[73] Assignee: The Brian Company, Vidalia, Ga.

[21] Appl. No.: 385,886

[22] Filed: Feb. 9, 1995

Related U.S. Application Data

[63] Continuation-in-part of Ser. No. 356,852, Dec. 15, 1994 abandoned.

[51] Int. Cl.$^6$ .................................................. H04M 11/04
[52] U.S. Cl. .............................. 379/44; 379/49; 379/438; 340/566
[58] Field of Search ..................... 379/33, 44, 387, 379/397, 399, 402, 411–413, 417, 419, 428, 429, 437, 438, 440, 442, 445, 451, 453, 457; 340/565, 566, 568–570, 665, 689, 540, 693; 70/277, 278, 282, 455

[56] References Cited

U.S. PATENT DOCUMENTS

| | | | |
|---|---|---|---|
| 3,748,389 | 7/1973 | Casterline et al. | 179/5 R |
| 3,767,867 | 10/1973 | Altenberger | 179/175.25 |
| 3,813,500 | 5/1974 | Roberts | 179/175.2 C |
| 4,361,833 | 11/1982 | Allgood | 340/533 |
| 4,559,828 | 12/1985 | Liszka | 739/658 |
| 4,638,129 | 1/1987 | Partus | 200/43.22 |
| 4,749,359 | 6/1988 | White | 379/437 |
| 4,800,588 | 1/1989 | Poster, Jr. . | |
| 4,887,290 | 12/1989 | Dop et al. | 379/33 |
| 4,969,178 | 11/1990 | Chen et al. | 379/33 |
| 5,153,566 | 10/1992 | Yun | 340/689 |
| 5,185,779 | 2/1993 | Dop et al. | 379/33 |
| 5,219,386 | 6/1993 | Kletzmaier et al. | 70/277 |
| 5,315,654 | 5/1994 | Kraft | 379/438 |
| 5,369,548 | 11/1994 | Combs . | |

FOREIGN PATENT DOCUMENTS 2605170  4/1988  France ............. H04Q 9/00

OTHER PUBLICATIONS

Telephone Network Interface Device Enclosure Model #ES601 by Sprint/North Supply, and manufactured by Enclosures for Security, Las Vegas, Nevada. Model #ES600 also available.

*Primary Examiner*—Wing F. Chan
*Attorney, Agent, or Firm*—Robert R. Reed; Cort Flint

[57] ABSTRACT

The present invention is directed to a local telephone line tamper protection device. In particular, it protects a conventional security alarm system using telephone lines from being disabled by an intruder before it has a chance to function. Telephone service lines are generally accessible from the exterior of the structure. The alarm system is protected by providing an service enclosure having a strong box and a conduit to enclose the telephone service box and service line. The protection device includes sensors and switches to inform the security monitor before an intruder can disable the alarm system. A vibration sensor is activated when movements of the strong box and conduit occur and a signal is generated to announce the intruder. The strong box has two access doors where the locked outside door must be opened to access the locked inside door. Each access door has a separate tamper switch means that generates a signal to also activate the alarm system. If the outside door is defeated the inside door continues to provide security. Another tamper switch means is provided to activate the alarm system if the intruder attempts to remove the strong box from its supporting surface. A total of four separate and redundant signals can inform the monitor of an intruder. This "LINEsafe" system far exceeds the protection currently provided for telephone operated alarm systems and can also be used to protect telephone lines when a separate alarm component is added.

20 Claims, 6 Drawing Sheets

LOCAL ALARM SYSTEM TAMPER PROTECTION DEVICE

This application is a continuation-in-part of application Ser. No. 356,852, filed Dec. 15, 1994 abandoned.

BACKGROUND OF THE INVENTION

This invention relates to a local telephone system tamper protection device. In particular, it is directed to be used with a conventional security alarm system, which may utilize an automatic telephone dialer to call a central monitoring system.

Prior art in this field, such as the literature on line cut monitors or cellular phone backup systems, have established the fact that conventional security alarm systems, which utilize automatic telephone dialers to call a central monitoring station, are rendered useless when a land based telephone line is cut. The telephone service lines are generally such that the telephone service line is easily to access by an intruder from the exterior of the structure being served.

Cellular backup systems for a standard security alarm system are disclosed in U.S. Pat. Nos. 4,887,290 and 5,185,779. An automatic switching to the cellular system occurs so that a digital communicator or telephone message tape dialer will still transmit a distress call to a central alarm monitor. A line default detector means will cause the telephone system to switch over to the cellular system in response to the fault. The cellular systems will not prevent the fault in the first place, but only reports its occurrence. A cellular backup system, which will take over for an inoperative land based phone line, adds to the installation expense of an alarm system, and a continuing monthly charge for the cellular system may be required.

Line cut monitor systems have addressed the problem by providing a detection device for notification that a line has been cut. These systems typically monitor line voltage and current with a circuit connected to a battery or DC-rectified AC power source. Typical references include U.S. Pat. Nos. 3,748,389; 3,767,867; and 4,969,178. In U.S. Pat No. 3,748,389 the monitoring system measures impedance between conductors having a DC polarity. A low impedance as well as a high impedance alarm responds to the open circuit or the closed circuit to indicate to the central office that an alarm condition exists at a subscribers set. A field effects transmitter is disclosed in U.S. Pat. No. 3,767,867 to relay the alarm activated by cutting a telephone wire. There is also a panic button in this system which may be activated for turning on manually the alarm. The panic button depends on the occupant of the structure knowing the intruder is present. The invention of U.S. Pat. No. 4,969,178 uses a voltage detection circuit, a current detection circuit, two control circuits and a comparator circuit to detect breaking, short-circuit or illegal connection of the subscriber local line. An alarm circuit and a sound generating circuit give a audio alarm signal when the local line fails. All of the line cut monitors effectively leave an occupant of the structure virtually defenseless in so far as having any means to telephone for help.

A switch activated alarm system to monitor vandalism is disclosed in U.S. Pat. No. 3,813,500. This alarm system is used with vending machines or pay-station telephones to monitor and control their usage. Contacts of a switch device are coupled with a high-value resistor to make up a leakage path. Current flowing through the leakage path also flows in a low-value resistor which is part of the alarm system circuit. The alarm circuit bridges the talking circuit making the system virtually transparent to a telephone subscriber. An important object of this system is to disable the pay-station or vending machine once vandalism has been attempted. No attempt is made to keep the systems operating once an attempt to vandalize is apparently being made.

The use of tamper switches is common in alarm systems to detect the opening of a window or a door. Further components include motion sensors, heat sensors and video cameras. Such components are normally reserved for commercial structures such as banks and can become expensive for the individual home owner. The use of vibration sensors with telephone line transmission of signals has also been used in special applications. For example, in U.S. Pat. No. 4,559,828 and French Patent No. 2,605,170 the continuous monitoring of machine vibrations is disclosed. The vibration signals are transmitted over telephone lines to a monitoring station for evaluation. These systems operate to continuously monitor vibrations and operate as a closed circuit at all times.

Tamper switches and other sensor devices can be connected in paralles or in series. The disclosure of U.S. Pat. No. 4,361,833 details two normal configurations which are either closed or open loop circuits as well as a "multiple-contact" sensor configuration. The alarm system of this patent can recondition itself by supervising the status of the sensors in the circuit path. Such systems are used with complex alarm systems having many sensors types which can be remotely located.

A primary object of the present invention is to provide protection from tampering for an exposed portion of a local telephone line as it enters a structure.

Another object of the present invention is to provide an alarm for processing (by a control unit of a conventional security alarm system) in the event of an attempt being initiated by an intruder to tamper with the local telephone line as it enters the structure and before a successful entry can be achieved.

Yet another object of the present invention is to have a generally affordable alternative to alarm system tampering which can be easily added to the already existing system to improve the protection afforded by the existing system by guarding against normal telephone communication failure.

SUMMARY OF THE INVENTION

The above objectives are accomplished according to the present invention by providing a protection device for the land based telephone service box and line that is effective in operation, flexible in its application and affordable by the general public.

The present invention is used in a telephone operated alarm system having a service box supplied by a telephone service line. The invention is a tamper protection device comprising a service enclosure for enclosing at least the service box to prohibit direct access to the service box and the service line. At least a vibration sensor is mounted within the enclosure to detect any vibrations of the enclosure caused by an intruder and to generate a first signal in response to the sensed vibrations. A connector circuit from the alarm system is to at least energize the vibration sensor and to transmit the first signal to the alarm system. The alarm system operates to announce an intruder.

A further embodiment of the invention includes the enclosure having a strong box portion with two access doors and being mounted on the same supporting surface as the service box is mounted. The outside door has a lock and must be opened to gain access to the inside locked door. The strong box may further include a first switch means being actuatable in response to the strong box being displaced from the supporting surface wherein a second signal is generated in the connector circuit. The connector circuit also transmits the second signal to the alarm system to announce an intruder.

An additional embodiment of the present invention includes the outside door having a second switch means being actuatable in response to opening the outside door and a third switch means being actuatable in response to the opening the inside door. A third signal is generated in the connector circuit when the second switch is actuated and a fourth signal is generated in the connector circuit when the third switch is actuated. The third and fourth signals are transmitted to the alarm system and the alarm system also announces the intruder when either the second or the third switch has been activated.

In yet another embodiment of the present invention the connector circuit includes a first system of electrical connectors from the alarm system to a terminal bar and a second system of electrical connectors from the terminal bar to the vibration sensor and to at least one of said switch means, wherein said first and second systems of electrical connectors are connected such that said alarm system operates as an open circuit system. In a similar embodiment of this invention the first and second systems of electrical connectors are connected such that said alarm system operates as a closed loop system.

In a final embodiment a conventional telephone as a total protected system includes a service box supplied by a service line in combination with the tamper protection device. A separate alarm system is required to announce an intruder.

DETAILED DESCRIPTION OF THE DRAWINGS

The construction designed to carry out the invention will hereinafter be described, together with other features thereof.

The invention will be more readily understood from reading the following specification and by referencing the accompanying drawings which form a part thereof; wherein an example of the invention is shown and wherein.

Figure 1:
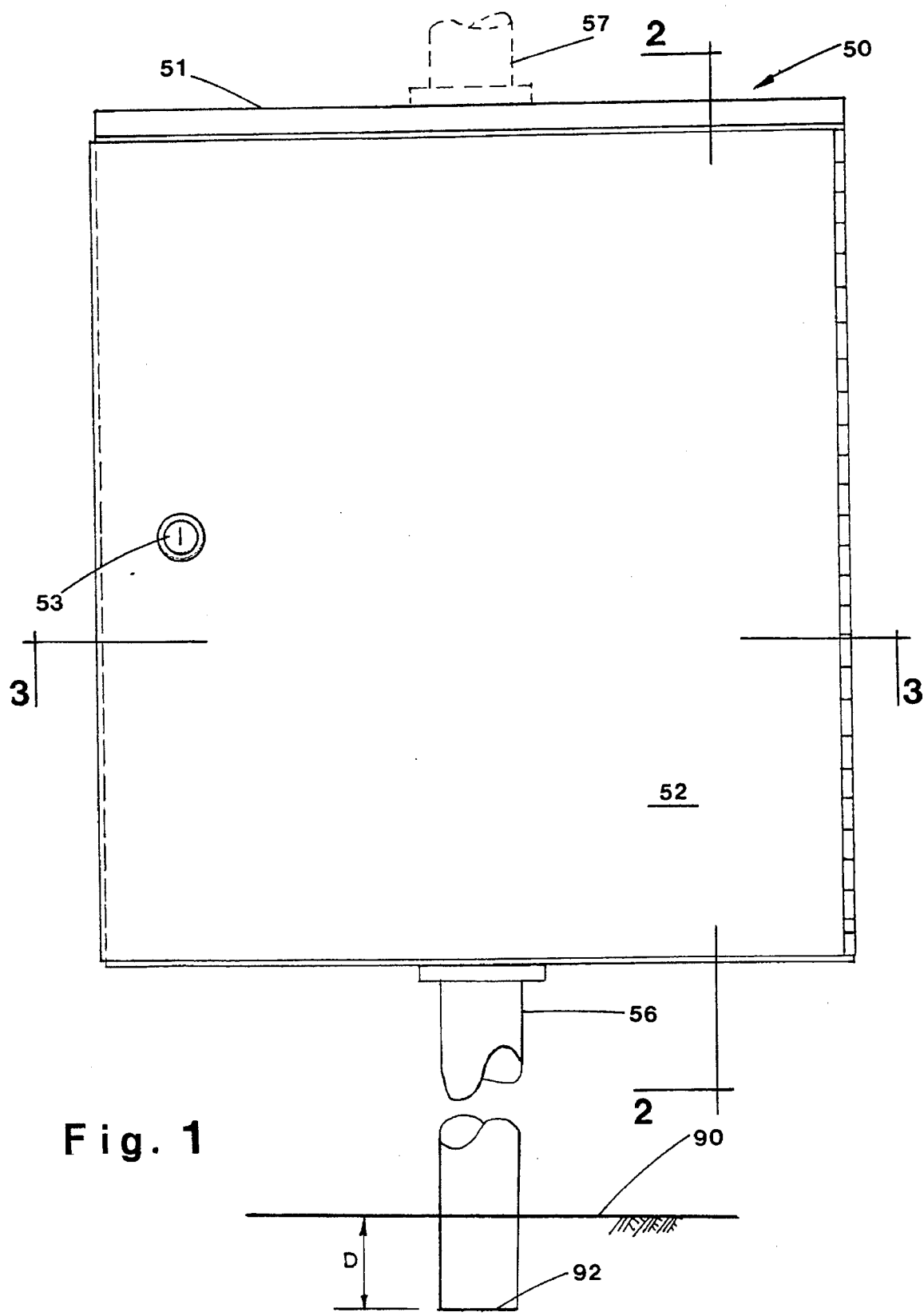
FIG. 1 is a front elevation of the tamper protection device showing an enclosure of this invention.
Figure 3:
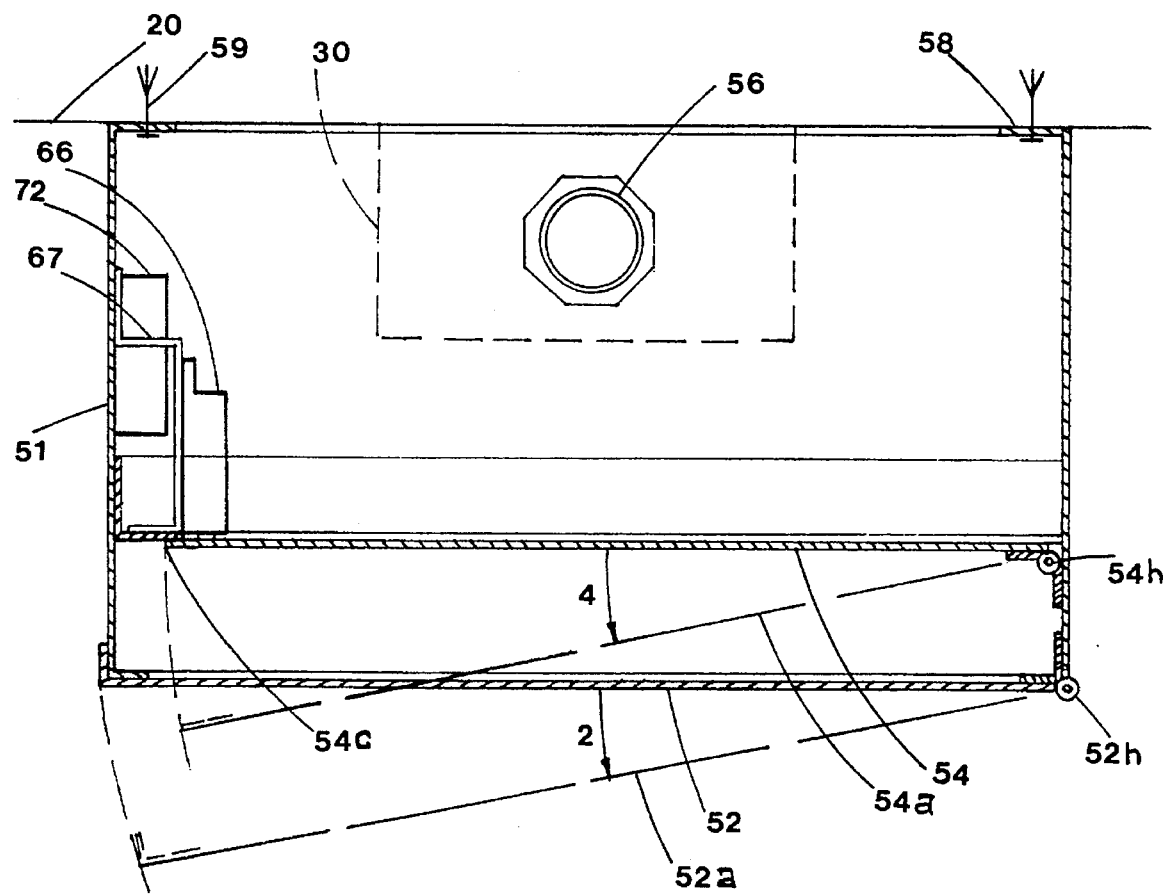
Figure 4:
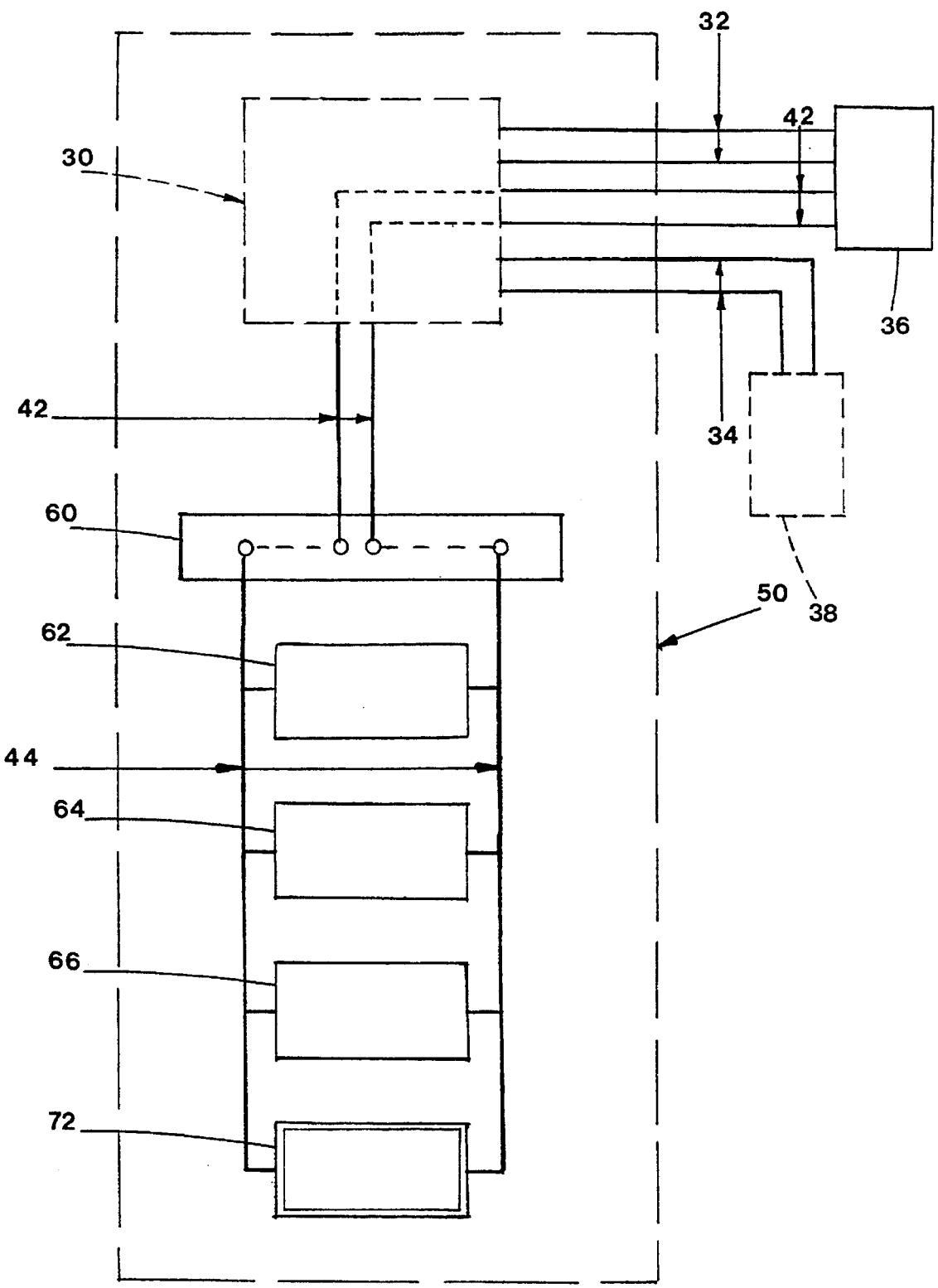

FIG. 3 is a sectional view of the device of this invention, taken along line 3—3 in FIG. 1, showing details of the preferred enclosure as well as some of the preferred components within the enclosure; and FIG. 4 is a schematic illustration of the preferred sensor and switch components of the invention being electrically connected as an open loop system to an alarm system service box also having telephone lines therein.

Figure 5:
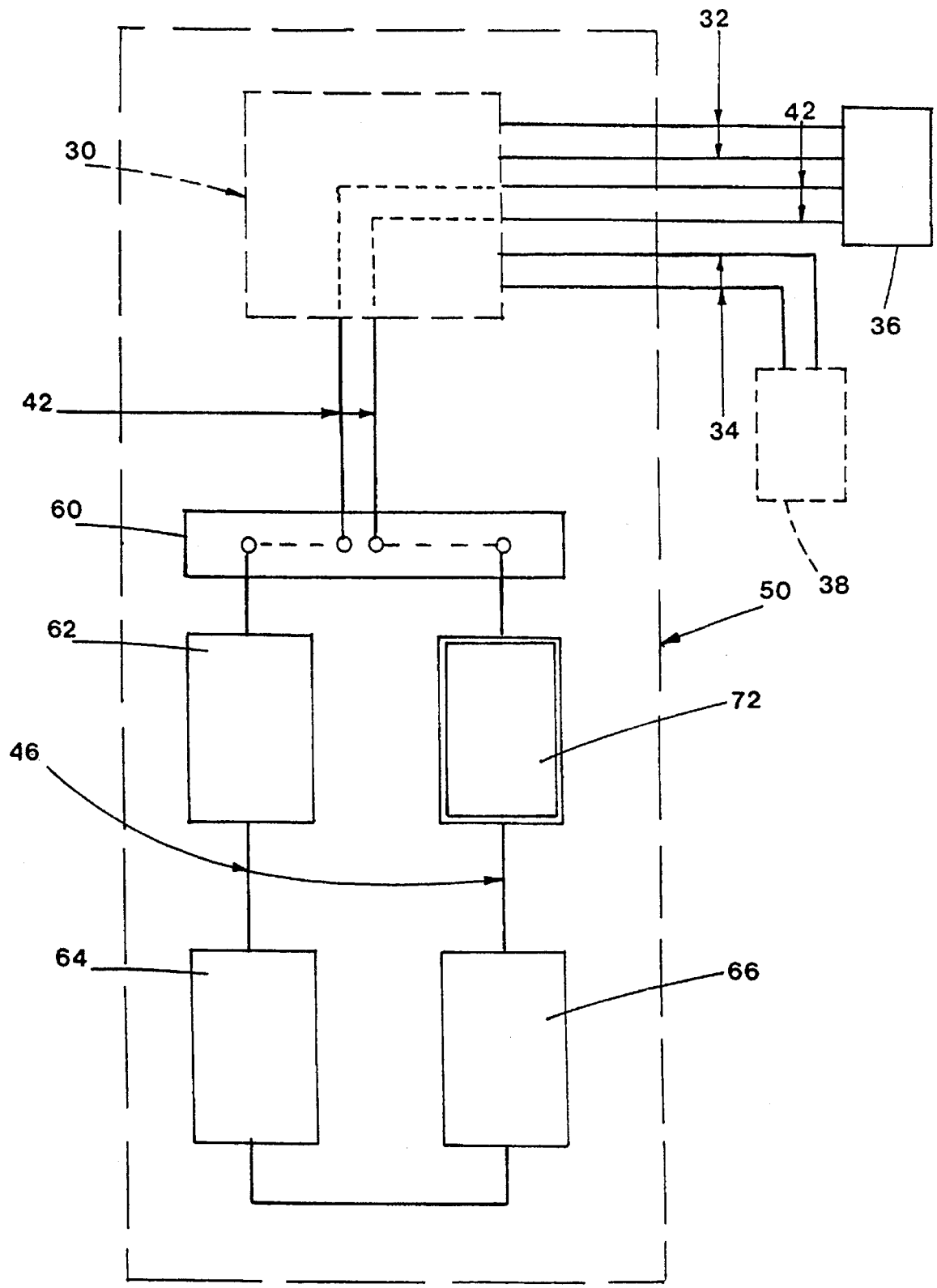
Figure 6:
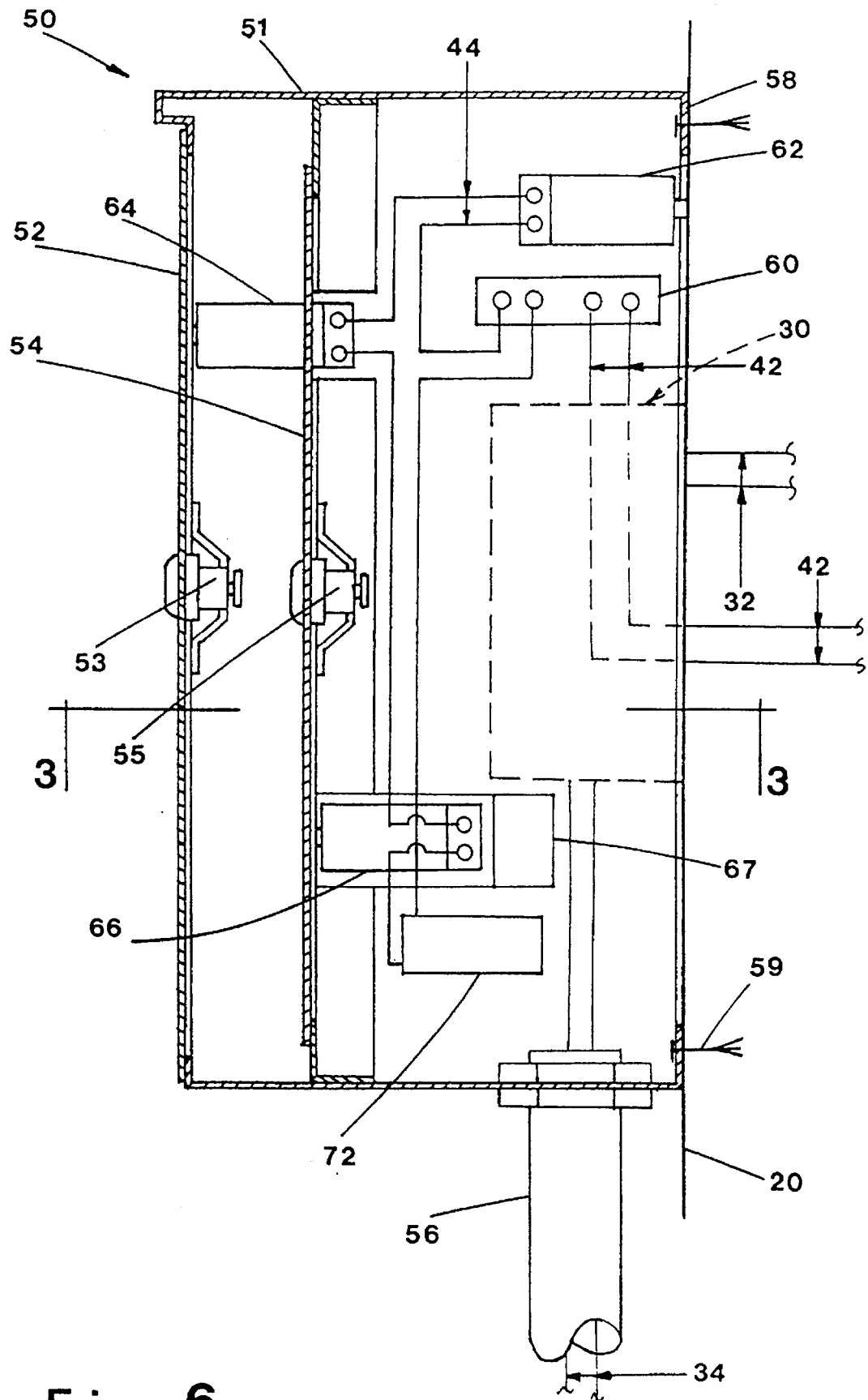

FIG. 5 is a schematic illustration of the preferred sensor and switch components of the invention being electrically connected as a preferred closed loop system to an alarm system service box having telephone lines therein;

FIG. 6 is a sectional view of the device of this invention, taken along line 2—2 in FIG. 1, showing details of a preferred enclosure as well as series connected components within the enclosure;

DESCRIPTION OF THE PREFERRED EMBODIMENTS

The present invention preferably provides a strong box portion of an enclosure with an open back to be secured to a supporting surface with appropriate fastener means over a service box of a telephone operated alarm system, as the telephone service enters a structure, to effect a protective encasement therewith. A normally exposed portion of the telephone line emerging from underground or suspended overhead and connected to the telephone service box shall is encased in a conduit portion of the enclosure. The conduit portion extends from the strong box to a predetermined safe position below the ground surface or above the top of the strong box. A front elevation view of this preferred enclosure 50 is illustrated in FIG. 1. The strong box 51 has been secured to the surface over the service box and conduit 56 extends to a distance D below the ground surface 90. The distance D is preferably in a range of about 12 to about 18 inches. Access to the service box starts with the outside door 52 having a outside door lock 53. An alternate configuration includes the conduit 57 extending out of the top of the strong box 51 for an overhead service line. The height of the conduit 57 above the strong box should be sufficient to prohibit reasonable access to the telephone service line. The strong box 51 may be made large enough to eliminate the conduit 56 or 57 within the scope of this invention. The enclosure 50, including the strong box 51, the conduit 56 or 57 and connecting components, is made from any suitable material from the group consisting of steel, copper, aluminum, iron or combinations thereof to provide an enclosure resistant to an intruder and one which will vibrate when disturbed. Non-metalic materials can also be used within the scope of this invention.

According to the present invention, if an attempt is made by an intruder to access the alarm system service box or service line, a vibration sensor will detect any vibrations of the enclosure. The vibration sensor is located within the enclosure 50 and can be seen in the sectional views illustrated in FIGS. 2, 3 and 6. The vibration sensor 72 is preferably located near the bottom of the strong box 51 to signal a blow as well as a sawing or cutting of the strong box or the rigid conduit 56 connected thereto. The vibration sensor 72 can be positioned to respond to any displacement which may be imposed on the enclosure. The most likely movement is a side to side displacement of the enclosure. Therefore, the preferred location of the vibration sensor 72 is on a side surface of the strong box to sense side to side movements. A number of vibration sensors can be used in parallel or in series to respond to other enclosure displacements. A single vibration sensor 72 is preferred for a cost effective tamper protection device. The vibration sensor allows a first signal to be generated in response to sensed vibrations. The existing telephone operated alarm system will be activated by this first signal.

The service box 30 of the telephone operated alarm system can contain the components of the alarm system. Alternately, the alarm components may be within a separate alarm box. Components of the alarm box may include a control panel for operating the alarm system for the structure, discrete dialer hardware, local audio transmitter, alarm connector circuits and the like. The remote alarm box would be connected directly to the telephone service box 30 as well as to the connector circuit of the present invention. FIGS. 2, 4, 5 and 6 show the first electrical connectors 42 coming indirectly through the telephone service box. Alternately, these connectors can come directly from an alarm box (not shown).

The vibration sensor has a weight at the end of a cantilever spring. This weighted end of the cantilever is used as a first terminal end. The circuit is either open or closed and the first signal is generated when the movement of the weighted cantilever end either breaks or makes contact within a second terminal end within the sensor device. The vibration sensor is more sensitive when operated as normally closed as is activated by breaking contact to provide a signal. For further details of a typical sensor refer to Radio Shack Catalog No. 49-521 as manufactured in Mexico for Radio Shack, a Division of Tandy Corp. of Fort Worth, Tex.

Figure 2:
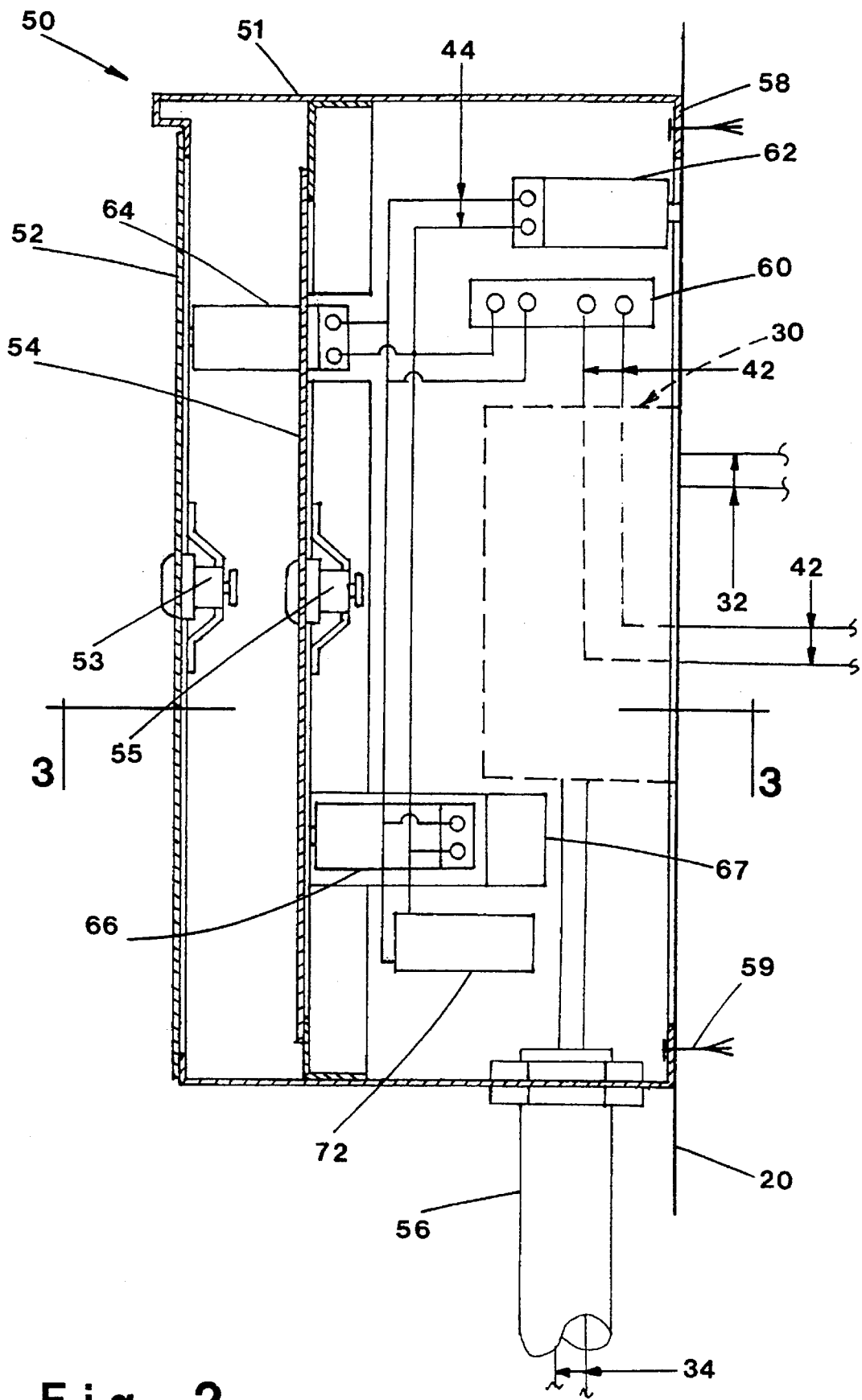
FIG. 2 is a sectional view of the device of this invention, taken along line 2—2 in FIG. 1, showing details of a preferred enclosure as well as parallel connected components within the enclosure.

The tamper protection device may also include a tamper switch that is actuated when the enclosure is removed from its supporting surface. A first switch 62, illustrated in FIGS. 2 and 6, is mounted on the inside of the enclosure 50 and contacts the supporting surface 20. When an intruder attempts to displace the enclosure 50 from the supporting surface 20 a second signal is generated by the first switch 62 being activated. The same telephone operated alarm system will be activated as a result of this second signal.

The tamper protection device of this invention has an enclosure with two access doors hinged at one side of the strong box, as illustrated in the sectional views of FIGS. 2, 3 and 6. An outside door 52 must be opened to gain access to the inside door 54. This double door system allows enough time for the alarm system to signal an intruder before the service line can be cut. Each door is equipped with a cabinet type locking mechanism being a first lock 53 for the outside door 52 and a second lock 55 for the inside door 54. The outside door 52a swings through an angle 2 about a hinge 52h when being opened. In addition, the inside door 54a swings through another angle 4 about a hinge 54h when being opened. The preferred type hinges are typical piano type hinges. The strong box 51 must be such that the inside door edge 54c is clear when inside door 54a is open. The same is true for the top and bottom edges of the inside door 54a when it is being opened. This two door arrangement is one of the preferred embodiments for the enclosure of this invention.

The two doors 52,54 of the enclosure can also be equipped with tamper switches. The outside door 52 has a second switch means 64 positioned inside the enclosure 50 being actuatable in response to opening the outside door 52. The second switch generates a third signal when the second switch is actuated. The inside door 54 has a third switch means 66 positioned inside the enclosure being actuatable in response to opening the inside door 54. A bracket 67 is used to position the third switch 64 inside this door. The third switch means generates a fourth signal when the third switch is activated. The system is redundant in that the third switch means 66 on the inner door 54 performs a backup function in case the second switch means 64 on the outside door 52 fails to operate. The same telephone operated alarm system will be activated with either or both the third and the fourth signals. These two switches 64,66 are preferably in addition to the vibration sensor 72 and the first switch 62 that also give a signal to operate the alarm system in its alarm signal normal mode. Any one of the three switches or the vibration sensor will activate the alarm system.

Signals are generated either by producing a current flow by closing the circuit when the normal (no alarm) operating condition is in an open loop circuit, or by interrupting a current flow by opening the circuit when the normal (no alarm) operating condition is a closed loop circuit. When any one of the the switches or the vibration sensor is activated they are changed from from their normal (no alarm) operating condition to the alarm condition and a signal is generated. The tamper protection device can be operated either as an open or a closed loop system. The electrical connectors of FIG. 2 illustrate an open loop parallel connection of the vibration sensor and the switches where the electrical connectors of FIG. 6 illustrate a closed loop series connection of these components.

The three switch means, being switches 62, 64 and 66, can be made to have a plunger portion that extends from a housing portion of the switch means which opens the circuit between terminal ends when the plunger is depressed. They are mounted in the enclosure 50 such that the plunger is depressed and the circuit is open. When either one of the two doors is opened or the enclosure is removed from the supporting surface the plunger extends from the housing portion and the two terminals ends are connected to close the circuit. The three switche means 62, 64 and 66 are preferably made to operate such that the switch means closes the circuit when the plunger is depressed and a no alarm current exists. When either door is opened or the enclosure is removed from the wall, the plunger extends and the terminal ends open the circuit. Either method of operation generates a signal for the alarm system to respond to. A second, third or fourth signal is generated by activating switch 62, 64 or 66 respectively. A typical tamper switch means is the DM series pushbutton switch (1DM2) manufactured by Micro Switch, a Division of Honeywell in Warren, Ill.

The telephone operated alarm system utilizes a telephone service box 30, a telephone service line 32 to a security alarm system 36, and a telephone service line 34 to the telephone company and further to a discrete alarm monitoring station 38 (FIGS. 4 and 5). The connection to the tamper protection device is provided by a first system of electrical connectors 42 from the alarm box (not shown) through the telephone Service box 30 to a terminal bar 60. The vibration sensor 72 and at least one of the three tamper switches 62,64,66 are connected in parallel for this open loop system of FIG. 4 by a second system of electrical connectors 44 from the terminal bar.

The preferred connector diagram is for a normally closed loop circuit tamper protection device as illustrated in FIG. 5. The first system of electrical connectors 42 from the alarm box to the terminal bar 60. A second system of electrical connectors 46 from the terminal bar connect the vibration sensor 72 and at least one of the three tamper switches 62,64,66 in series.

This arrangement of the components permits an alarm signal to be generated by any one of the components being activated to produce a first, second, third or fourth signal. Any alarm signal operates the alarm system in its normal operating mode to announce an intruder. The preferred system has all four actuatable components installed to insure the security of the alarm system. However, any one of these components may produce the desired results, such as the vibration sensor alone. A typical terminal bar is Radio Shack Catalog No. 274-658 as manufactured for Radio Shack, a Division of Tandy Corporation, Fort Worth, Tex.

The tamper protection device of this invention can be used to protect any telephone system having a service box and service line within the scope of this invention. A separate alarm system is required to announce the intruder. Any conventional on-site audio or off-site monitoring system would be sufficient for this purpose. Such systems generally operate using a AC-rectified DC power source.

While a preferred embodiment of the invention has been described using specific terms, such description is for illustrative purposes only, and it is to be understood that changes and variations may be made without departing from the spirit or scope of the following claims.

What is claimed is:

1. In a telephone operated security alarm system which utilizes a telephone service box connected to telephone service lines, said security alarm system including a security alarm box electrically connected to said telephone service box for transmitting alarm signals to personnel at a discrete alarm monitoring station over said telephone service lines, a tamper protection device comprising:

a secured service enclosure for enclosing said telephone service box and an exposed portion of said telephone service lines to prohibit direct access to said telephone service box and said telephone service line portion by an intruder;

at least one vibration sensor mounted within said secured service enclosure to detect small and large amplitude vibrations of said service enclosure caused by any physical tampering of said secured service enclosure including that portion enclosing said telephone lines by an intruder to generate a first signal in response to said tampering; and a connector circuit electrically connected between said secure alarm box and said secured service enclosure to energize said at least one vibration sensor and to transmit said first signal from said service enclosure to said alarm system, wherein said security alarm system generates an alarm signal for transmission over said telephone service lines to announce an intruder to said personnel at said remote monitoring station.

2. The tamper protection device of claim 1, wherein the enclosure includes a strong box portion having two access doors and being mounted on the same supporting surface as the service box is mounted, wherein an outside door has a lock and must be opened to gain access to an inside locked door.

3. The tamper protection device of claim 2, wherein said strong box has a first switch means being actuatable in response to said strong box being displaced from said support surface, wherein a second signal is generated in said connector circuit that transmits said second signal to said alarm system to announce said intruder.

4. The tamper protection device of claim 2, wherein said outside access door has a second switch means being actuatable in response to opening said outside door and said inside access door has a third switch means being actuatable in response to opening said inside door, wherein a third signal is generated in said connector circuit from said second switch being actuated that transmits said third signal to said alarm system and a fourth signal is generated in said connector circuit from said third switch being actuated that transmits said fourth signal to said alarm system, whereas said alarm system announces said intruder from either said second or said third switch means being actuated.

5. The tamper protection device of claim 2, wherein the enclosure further includes a conduit to encase said service line, wherein said conduit is made of a material that will transmit movements of said conduit in the form of solid vibrations to said vibration sensor in response to said intruder induced movements of said conduit.

6. The tamper protection device of claim 5, wherein the enclosure is made from any suitable material from the group consisting of steel, copper, aluminum, iron, or combinations thereof.

7. The tamper protection device of claim 1, wherein said connector circuit comprises:

a first system of electrical connectors from said alarm system to a terminal bar; and a second system of electrical connectors from said terminal bar to at least said vibration sensor.

8. The tamper protection device of claim 4, wherein said connector circuit is a system of first and second electrical connectors and a terminal bar for energizing said protection device and for transmitting said first, third, and fourth signals to said alarm system to announce said intruder.

9. The tamper protection device of claim 4, wherein said connector circuit comprises:

a first system of electrical connectors from said alarm system to a terminal bar; and a second system of electrical connectors from said terminal bar to said vibration sensor as well as to at least one switch means, wherein said second system of electrical connectors operates said circuit either as a closed loop or as an open loop circuit.

10. In a telephone operated security alarm system which utilizes a telephone service box connected to telephone service lines, said security alarm system including a security alarm box electrically connected to said telephone service box for transmitting alarm signals to personnel at a discrete alarm monitoring station over said telephone service lines, a tamper protection device comprising:

a secured service enclosure for enclosing at least said telephone service box to prohibit direct access to at least said telephone service box, said service enclosure being mounted on a supporting surface being the same surface as the telephone service box is mounted thereupon;

an inside access door included in said service enclosure to cover said telephone service box and prevent any physical tampering with said telephone service box and connecting telephone service lines;

an outside access door included in said service enclosure to cover said inside access door which must be opened to gain access to said inside access door and further prevent any physical tampering with said telephone service box and connecting telephone service lines;

a first door lock carried by said outside access door for positively locking said outside access door so that said inside access door and said telephone service box are inaccessible, said first door lock having a locked position activated to an unlocked position only by an authorized person having a lock actuator device;

a second door lock carried by said inside access door for positively locking said inside access door so that said telephone service box is inaccessible, said second door lock having a locked position activated to an unlocked position only by an authorized person having a lock actuator device, wherein said outside door must be opened to gain access to said inside door and wherein at least one of said inside and outside access doors has a hinge positioned to prohibit access to said hinge from the exterior of said service enclosure to further prevent unauthorized door opening and further protect at least said telephone service box against tampering;

a second switch energized by said alarm system and being actuatable in response to the unauthorized opening of said outside access door, wherein a third electrical signal is generated;

a third switch energized by said alarm system being actuatable in response to the unauthorized opening of said inside access door, wherein a fourth electrical signal is generated; and a connector circuit that transmits either one of said third or said fourth electrical signal to said security alarm system so that said third signal is transmitted by said connector circuit to said alarm system prior to transmission of said fourth signal to provide an alarm signal prior to the inside access door being opened to gain access to and cut any telephone service line, whereas the security alarm system operates to announce an intruder to said discrete alarm monitoring station over said telephone service lines.

11. The tamper protection device of claim 10, wherein said service enclosure includes a strong box portion having a first switch means being actuatable in response to said strong box being displaced from said support surface, wherein a second signal is generated in said connector circuit that transmits said second signal to said alarm system to announce said intruder.

12. The tamper protection device of claim 10, wherein said service enclosure has a vibration sensor mounted within said enclosure to detect any vibrations of said enclosure caused by an intruder, said vibration sensor generating a first signal in response to said vibrations, wherein said first signal is generated in said connector circuit that transmits said first signal to said alarm system to announce said intruder.

13. The tamper protection device of claim 10, wherein the enclosure includes a conduit to encase said service line and a strong box to enclose said service box, wherein said conduit and said strong box is of a material that will transmit movements of said conduit or said strong box in the form of solid vibrations to a vibration sensor in response to said intruder induced movements to said conduit or said strong box.

14. The tamper protection device of claim 12, wherein said enclosure further includes a conduit to encase said service line, wherein said conduit is of a material that will transmit movements of said conduit in the form of vibrations to said vibration sensor in response to said intruder induced movements of said conduit.

15. The tamper protection device of claim 14 wherein the enclosure is made from any suitable material from the group consisting of steel, copper, aluminum, iron or combinations thereof.

16. The tamper protection device of claim 11, wherein said connector circuit comprises:

a first system of electrical connectors from said alarm system to a terminal bar; and a second system of electrical connectors from said terminal bar to at least said first, second and third switch means.

17. The tamper protection device of claim 12, wherein said connector circuit is a system of first and second electrical connectors and a terminal bar for energizing said protection device and for transmitting said first, third, and fourth signals to said alarm system to announce said intruder.

18. A telephone operated security alarm system which utilizes a telephone service box having telephone service lines, said tamper protection system including:

a security alarm box electrically connected to said telephone service box for transmitting alarm signals to personnel at a discrete alarm monitoring station using said telephone service lines;

a service enclosure for enclosing at least said telephone service box and a portion of said service lines to prohibit direct access to said telephone service box and said portion of said telephone service lines;

a vibration sensor mounted within said service enclosure to detect any vibrations of said service enclosure and generate a first electrical signal in response to said vibrations;

a first switch means mounted on said service enclosure being actuatable in response to displacing said enclosure from a supporting surface upon which the service enclosure is mounted for generating a second electrical signal;

an outside access door included in said enclosure having a second switch being actuatable in response to opening said outside door for generating a third electrical signal;

an inside access door included in said enclosure, enclosed by and accessible only through said outside door, having a third switch being actuatable in response to opening said inside door for generating a fourth electrical signal;

a first door lock carried by said outside access door for positively locking said outside door so that said inside access door and said telephone service box are inaccessible;

an second door lock carried by said inside access door for positively locking said inside access door so that said telephone service box is inaccessible; and said first and second locks prohibiting direct access to the inside of said service enclosure and said security alarm box from receiving any one of said first, second, third and fourth signals and wherein said third signal provides an alarm signal to said security alarm box prior to the opening of said inside access door and prior to an intruder having access to said telephone service box or lines so that the alarm system operates to announce said intruder to said alarm monitoring station using said telephone service lines before said lines can be cut.

19. The alarm system of claim 18, wherein said system further includes a connector circuit having a first system of electrical connectors from said alarm system to a terminal bar and a second system of electrical connectors from said terminal bar to said vibration sensor and at least one of said first, second and third switch means, such that said first and second system of electrical connectors connect said system as an open circuit system.

20. The alarm system of claim 18, wherein said system further includes a connector circuit having a first system of electrical connectors from said alarm system to a terminal bar and a second system of electrical connectors from said terminal bar to said vibration sensor and at least one of said first, second and third switch means, such that said first and second system of electrical connectors connect said system as a closed circuit system.

* * * * *